(12) United States Patent
Meier et al.

(10) Patent No.: US 9,710,268 B2
(45) Date of Patent: Jul. 18, 2017

(54) REDUCING LATENCY FOR POINTER CHASING LOADS

(71) Applicant: Apple Inc., Cupertino, CA (US)

(72) Inventors: Stephan G. Meier, Los Altos, CA (US); Pradeep Kanapathipillai, Santa Clara, CA (US); Sandeep Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 14/264,789

(22) Filed: Apr. 29, 2014

(65) Prior Publication Data

US 2015/0309792 A1    Oct. 29, 2015

(51) Int. Cl.
G06F 9/38    (2006.01)
G06F 9/30    (2006.01)

(52) U.S. Cl.
CPC ........ *G06F 9/30043* (2013.01); *G06F 9/3861* (2013.01)

(58) Field of Classification Search
None
See application file for complete search history.

(56) References Cited

U.S. PATENT DOCUMENTS

| | | |
|---|---|---|
| 4,521,851 A | 6/1985 | Trubisky et al. |
| 4,594,660 A | 6/1986 | Guenthner et al. |
| 4,860,199 A | 8/1989 | Langendorf et al. |
| 5,276,825 A | 1/1994 | Blomgren et al. |
| 5,404,470 A | 4/1995 | Miyake |
| 5,440,752 A | 8/1995 | Lentz et al. |
| 5,465,336 A | 11/1995 | Imai et al. |
| 5,467,473 A | 11/1995 | Kahle et al. |
| 5,471,598 A | 11/1995 | Quattromani et al. |
| 5,475,823 A | 12/1995 | Amerson et al. |
| 5,487,156 A | 1/1996 | Popescu et al. |
| 5,490,259 A | 2/1996 | Hiraoka et al. |
| 5,557,763 A | 9/1996 | Senter et al. |

(Continued)

FOREIGN PATENT DOCUMENTS

| | | |
|---|---|---|
| EP | 0651323 A1 | 5/1995 |
| EP | 0651331 A1 | 5/1995 |

(Continued)

OTHER PUBLICATIONS

Notification of the Third Office Action in Chinese Application No. 201310323392.0, mailed Jun. 28, 2016, 15 pages.

(Continued)

*Primary Examiner* — John Lindlof
(74) *Attorney, Agent, or Firm* — Rory D. Rankin; Meyertons, Hood, Kivlin, Kowert & Goetzel, P.C.

(57) ABSTRACT

Systems, methods, and apparatuses for reducing the load to load/store address latency in an out-of-order processor. When a producer load is detected in the processor pipeline, the processor predicts whether the producer load is going to hit in the store queue. If the producer load is predicted not to hit in the store queue, then a dependent load or store can be issued early. The result data of the producer load is then bypassed forward from the data cache directly to the address generation unit. This result data is then used to generate an address for the dependent load or store, reducing the latency of the dependent load or store by one clock cycle.

18 Claims, 9 Drawing Sheets

(56) References Cited

U.S. PATENT DOCUMENTS

| | | | |
|---|---|---|---|
| 5,606,670 | A | 2/1997 | Abramson et al. |
| 5,619,662 | A | 4/1997 | Steely, Jr. et al. |
| 5,625,789 | A | 4/1997 | Hesson et al. |
| 5,625,835 | A | 4/1997 | Ebcioglu et al. |
| 5,651,125 | A | 7/1997 | Witt et al. |
| 5,652,859 | A | 7/1997 | Mulla et al. |
| 5,666,506 | A | 9/1997 | Hesson et al. |
| 5,710,902 | A | 1/1998 | Sheaffer et al. |
| 5,717,883 | A | 2/1998 | Sager |
| 5,742,791 | A | 4/1998 | Mahalingaiah et al. |
| 5,748,978 | A | 5/1998 | Narayan et al. |
| 5,751,983 | A | 5/1998 | Abramson et al. |
| 5,754,812 | A | 5/1998 | Favor et al. |
| 5,761,712 | A | 6/1998 | Tran et al. |
| 5,768,555 | A | 6/1998 | Tran et al. |
| 5,781,752 | A | 7/1998 | Moshovos et al. |
| 5,781,790 | A | 7/1998 | Abramson et al. |
| 5,799,165 | A | 8/1998 | Favor et al. |
| 5,802,588 | A | 9/1998 | Ramagopal et al. |
| 5,822,559 | A | 10/1998 | Narayan et al. |
| 5,832,297 | A | 11/1998 | Ramagopal et al. |
| 5,835,747 | A | 11/1998 | Trull |
| 5,850,533 | A | 12/1998 | Panwar et al. |
| 5,878,252 | A * | 3/1999 | Lynch ............ G06F 9/30032 711/118 |
| 5,884,060 | A | 3/1999 | Vegesna et al. |
| 5,884,061 | A | 3/1999 | Hesson et al. |
| 5,887,152 | A | 3/1999 | Tran |
| 5,923,862 | A | 7/1999 | Nguyen et al. |
| 5,996,068 | A | 11/1999 | Dwyer, III et al. |
| 6,016,540 | A | 1/2000 | Zaidi et al. |
| 6,021,485 | A | 2/2000 | Feiste et al. |
| 6,108,770 | A | 8/2000 | Chrysos et al. |
| 6,122,727 | A | 9/2000 | Witt |
| 6,141,747 | A | 10/2000 | Witt |
| 6,212,622 | B1 | 4/2001 | Witt |
| 6,212,623 | B1 | 4/2001 | Witt |
| 6,266,744 | B1 | 7/2001 | Hughes et al. |
| 6,393,536 | B1 | 5/2002 | Hughes et al. |
| 6,481,251 | B1 | 11/2002 | Meier et al. |
| 6,502,185 | B1 | 12/2002 | Keller et al. |
| 6,523,109 | B1 | 2/2003 | Meier |
| 6,542,984 | B1 | 4/2003 | Keller et al. |
| 6,564,315 | B1 | 5/2003 | Keller et al. |
| 6,571,318 | B1 | 5/2003 | Sander et al. |
| 6,622,235 | B1 | 9/2003 | Keller et al. |
| 6,622,237 | B1 | 9/2003 | Keller et al. |
| 6,625,723 | B1 | 9/2003 | Jourday et al. |
| 6,651,161 | B1 | 11/2003 | Keller et al. |
| 6,658,554 | B1 | 12/2003 | Moshovos et al. |
| 6,658,559 | B1 | 12/2003 | Arora et al. |
| 6,662,280 | B1 | 12/2003 | Hughes |
| 6,678,807 | B2 | 1/2004 | Boatright et al. |
| 6,694,424 | B1 | 2/2004 | Keller et al. |
| 6,704,854 | B1 | 3/2004 | Meier et al. |
| 6,728,867 | B1 | 4/2004 | Kling |
| 6,918,030 | B2 | 7/2005 | Johnson |
| 7,062,617 | B2 | 6/2006 | Dundas et al. |
| 7,181,598 | B2 | 2/2007 | Jourdan et al. |
| 7,376,817 | B2 | 5/2008 | Kadambi et al. |
| 7,415,597 | B2 | 8/2008 | Filippo et al. |
| 8,301,865 | B2 | 10/2012 | Grohoski et al. |
| 9,116,817 | B2 | 8/2015 | Meier |
| 9,128,725 | B2 | 9/2015 | Meier et al. |
| 2002/0178349 | A1 | 11/2002 | Shibayama et al. |
| 2003/0065909 | A1 | 4/2003 | Jourdan |
| 2003/0126409 | A1 | 7/2003 | Juan et al. |
| 2003/0217251 | A1 | 11/2003 | Jourdan et al. |
| 2005/0120179 | A1* | 6/2005 | Akkary ............ G06F 12/0875 711/126 |
| 2005/0268075 | A1 | 12/2005 | Caprioli et al. |
| 2006/0095734 | A1 | 5/2006 | Filippo et al. |
| 2006/0248281 | A1 | 11/2006 | Al-Sukhni et al. |
| 2007/0226470 | A1 | 9/2007 | Krimer et al. |
| 2007/0288726 | A1 | 12/2007 | Luick et al. |
| 2008/0082794 | A1 | 4/2008 | Yu et al. |
| 2008/0183986 | A1 | 7/2008 | Yehia et al. |
| 2009/0083263 | A1 | 3/2009 | Felch et al. |
| 2009/0187727 | A1 | 7/2009 | Caprioli et al. |
| 2010/0205384 | A1 | 8/2010 | Beaumont-Smith et al. |
| 2010/0293347 | A1 | 11/2010 | Luttrell et al. |
| 2010/0325395 | A1 | 12/2010 | Burger et al. |
| 2011/0138149 | A1 | 6/2011 | Karlsson et al. |
| 2011/0143811 | A1 | 6/2011 | Rodriguez |
| 2011/0153986 | A1 | 6/2011 | Alexander et al. |
| 2013/0298127 | A1 | 11/2013 | Meier et al. |
| 2013/0326198 | A1 | 12/2013 | Meier et al. |
| 2015/0154106 | A1* | 6/2015 | Pusdesris ............ G06F 12/023 711/154 |

FOREIGN PATENT DOCUMENTS

| | | |
|---|---|---|
| EP | 0709770 A2 | 5/1996 |
| EP | 0727737 A2 | 8/1996 |
| GB | 2281442 A | 3/1995 |
| TW | 200841238 A | 10/2008 |
| TW | 201003516 A | 1/2010 |
| TW | 201033898 A1 | 9/2010 |
| WO | 96/12227 A1 | 4/1996 |
| WO | 97/27538 A1 | 7/1997 |
| WO | 01/50252 A1 | 7/2001 |
| WO | 2006/028555 A2 | 3/2006 |

OTHER PUBLICATIONS

Jamil, Tariq, "RAM versus CAM", 1997, IEEE, 0278-6648/97, pp. 26-29, [retrieved on Feb. 5, 2015], retrieved from URL <http://ieeexplore.ieee.org/stamp/stamp.jsp?tp=&arnumber=580445>.

Kubiatowicz, John, "Reorder Buffers and Explicit Register Renaming", Sep. 22, 2000, 55 pages, [retrieved on Feb. 5, 2015], retrieved from URL <http://www.cs.berkeley.edu/~kubitron/courses/cs252-F00/lectures/lec07-renamereorder.ppt>.

Communication pursuant to Article 94(3) EPC in European Application No. 13165284.4, mailed Jul. 23, 2014, 6 pages.

Notice of Preliminary Rejection in Korean Patent Application No. 10-2013-49975, mailed Jul. 23, 2014, 11 pages.

Jaleel et al., "Using Virtual Load/Store Queues (VLSQs) to Reduce the Negative Effects of Reordered Memory Instructions", In the Proceedings of the 11th International Symposium on High-Performance Computer Architecture, Feb. 2005, 10 pages, IEEE Computer Society, Washington, DC, USA.

Leibholz, et al., "The Alpha 21264: A 500 MHz Out-of Order Execution Microprocessor", Feb. 1997, IEEE, pp. 28-36, IEEE Computer Society Press, Los Alamitos, CA, USA.

Popescu et al., "The Metaflow Architecture", IEEE Micro, Jun. 1991, pp. 10-13 and 63-73, IEEE Computer Society Press, Los Alamitos, CA, USA.

Moshovos et al., "Speculative Memory Cloaking and Bypassing", International Journal of Parallel Programming, Dec. 1999, 15 pages, Kluwer Academic Publishers, Norwell, MA, USA.

Moshovos et al., "Streamlining Inter-operation Memory Communication via Data Dependence Prediction", In Proceedings of the 30th International Symposium on Microarchitecture, Dec. 1997, 11 pages, IEEE Computer Society, Washington, DC, USA.

Gopal et al., "Speculative Versioning Cache", In Proceedings of the 4th International Symposium on High-Performance Computer Architecture, Jan. 1998, 11 pages, IEEE Computer Society, Washington, DC, USA.

Chrysos et al., "Memory Dependence Prediction Using Store Sets", Proceedings of the 25th Annual International Symposium on Computer Architecture, Apr. 16, 1998, 12 pages, IEEE Computer Society, Washington, DC, USA.

Moshovos et al., "Dynamic Speculation and Synchronization of Data Dependences", Proceedings of the 24th Annual International Symposium on Computer Architecture, Jun. 1, 1997, 13 pages, ACM, New York, NY, USA.

Johnson, Mike, "Superscalar Microprocessor Design", 1991, pp. 127-129, Prentice-Hall, Inc., Englewood Cliffs, NJ, USA.

(56) References Cited

OTHER PUBLICATIONS

Gwennap, Linley, "Digital 21264 Sets New Standard: Clock Speed, Complexity, Performance Surpass Records, But Still a Year Away", Microdesign Resources, Oct. 28, 1996, 6 pages, vol. 10, No. 14.
Reinman, et al. "Predictive Techniques for Aggressive Load Speculation", In the Proceedings of the Annual 31st International Symposium on Microarchitecture, Dec. 1998, pp. 127-137, IEEE Computer Society Press, Los Alamitos, CA, USA.
International Search Report and Written Opinion in application No. PCT/US2013/041852 mailed Sep. 30, 2013 pp. 1-14.
Office Action in Taiwan Patent Application No. 102115961, mailed Nov. 20, 2014, 23 pages.
Office Action in Japanese Patent Application No. 2013-096795, mailed Aug. 18, 2014, 27 pages.
International Search Report and Written Opinion in application No. PCT/US2013/037809 mailed Sep. 10, 2013 pp. 1-16.
Extended Search Report in EP Application No. 13165284.4-1957, Sep. 30, 2013, pp. 1-9.
Notice of Last Preliminary Rejection in Korean Patent Application No. 10-2013-49975, mailed Feb. 9, 2015, 4 pages.
Office Action in Taiwan Patent Application No. 102119009, mailed Feb. 13, 2015, 6 pages.
Final Office Action in Japanese Patent Application No. 2013-096795, mailed Mar. 4, 2015, 19 pages.
Non-Final Office Action in U.S. Appl. No. 13/483,268, mailed Feb. 23, 2015, 28 pages.
Jacob, Bruce, "The RiSC-16 Instruction-Set Architecture", 2000, 4 pages, [retrieved on Jan. 30, 2015], retrieved from URL <http://www.eng.umd.edu/~blj/RiSC/RiSC-isa.pdf>.
"Dynamic Scheduling", Jul. 13, 2010, 11 pages, [retrieved on Jan. 30, 2015], retrieved from URL <http://www.ece.unm.edu/~jimp/611/slides/chap4_4.html>.
"ARM Compiler toolchain: Using the Assembler", 2011, ARM, 4 pages, [retrieved on Jan. 30, 2015], retrieved from URL <http://infocenter.arm.com/help/index.jsp?topic=/com.arm.doc.dui0473c/CEGCCADE.html>.
Notification of the First Office Action in Chinese Application No. 201310323392.0, mailed May 4, 2015, 33 pages.
Final Office Action in U.S. Appl. No. 13/483,268, mailed Jun. 15, 2015, 12 pages.

\* cited by examiner

Table 400

| Instructions in Program Order | Line Number | Location of Source Data for Load Instruction | Changes in Scheduling |
|---|---|---|---|
| R13 ← LD 8(R30) | Line 1 | Source Data from Data Cache | |
| R19 ← R13 + R22 | Line 2 | | |
| 0(R30) ← ST R19 | Line 3 | | |
| R2 ← LD 8(R19) | Line 4 | Source Data from ALU adder or Store Queue | |
| R29 ← R13 + R2 | Line 5 | | |
| 4(R10) ← ST R29 | Line 6 | | |
| R11 ← LD 4(R2) | Line 7 | Source Data from Load Queue via D-Cache | |
| R19 ← R13 + R11 | Line 8 | | |
| 0(R30) ← ST R19 | Line 9 | | |
| R3 ← LD 8(R29) | Line 10 | Source Data from Store Queue (or ALU adder) | |
| R28 ← R3 + R5 | Line 11 | | |
| 4(R14) ← ST R28 | Line 12 | | |
| R25 ← LD 4(R3) | Line 13 | Source Data from Load Queue via D-Cache | |
| R6 ← R13 + R25 | Line 14 | | |
| 0(R1) ← ST R6 | Line 15 | | |
| R7 ← LD 8(R3) | Line 16 | Source Data from Load Queue via D-Cache | |
| R4 ← R11 + R7 | Line 17 | | |
| 4(R9) ← ST R4 | Line 18 | | |
| R10 ← LD 4(R7) | Line 19 | Source Data from Load Queue via D-Cache | Schedule early |
| R21 ← R10 + R10 | Line 20 | | |
| 4(R18) ← ST R21 | Line 21 | | |
| R16 ← LD 4(R10) | Line 22 | Source Data from Load Queue via D-Cache | Schedule early |
| R24 ← LD 4(R16) | Line 23 | Source Data from Load Queue via D-Cache | Schedule early |
| R27 ← ST R24 | Line 24 | Source Data from Load Queue via D-Cache | Schedule early |

FIG. 4

| | | | | | |
|---|---|---|---|---|---|
| \multicolumn{6}{c}{LSD Predictor Table 500} |

| Valid | Producer PC | Store RNUM | Armed | Dependent PC | Status |
|---|---|---|---|---|---|
| 510 | 520 | 530 | 540 | 550 | 560 |

FIG. 5

REDUCING LATENCY FOR POINTER CHASING LOADS

BACKGROUND

Technical Field

Embodiments described herein relate to computing systems, and more particularly, to methods and mechanisms for reducing the latency of load and store operations in processors.

Description of the Related Art

Processors generally include support for load memory operations and store memory operations to facilitate transfer of data between the processors and memory to which the processors may be coupled. As used herein, a load memory operation is an operation specifying a transfer of data from a main memory to the processor (although the transfer may be completed in cache). A store memory operation is an operation specifying a transfer of data from the processor to memory. Load and store memory operations may be an implicit part of an instruction which includes a memory operation, or may be explicit instructions, in various implementations. Load and store memory operations are more succinctly referred to herein as loads and stores, respectively.

A given load/store specifies the transfer of one or more bytes beginning at a memory address calculated during execution of the load/store. This memory address is referred to as the data address of the load/store. The load/store itself (or the instruction from which the load/store is derived) is located by an instruction address used to fetch the instruction, also referred to as the program counter address (or PC). The data address is typically calculated by adding one or more address operands specified by the load/store to generate an effective address or virtual address, which may optionally be translated through an address translation mechanism to a physical address of a memory location within the memory.

Load and store operations are typically executed on a stage-by-stage basis within a processor pipeline. As the clock frequencies of processors continues to increase, these higher clock frequencies limit the levels of logic to fit within a single clock cycle. The deep pipelining trend has made it advantageous to predict the events that may happen in the pipe stages ahead. One example of this technique is latency speculation between an instruction and a younger (in program order) dependent instruction. The program order of instructions is the order in which the instructions would be executed if they were executed one at a time and non-speculatively. The program order is created by the programmer (and/or compiler) of the program being executed. In out-of-order processors, younger dependent instructions may be picked for out-of-order (o-o-o) issue and execution prior to a broadcast of the results of a corresponding older (in program order) instruction. The deep pipelining trend increases a latency to receive and use load (read) operation result data.

One example of the above instruction dependency and latency speculation is a load-to-load dependency. A younger (in program order) load instruction may be dependent on an older (in program order) load instruction. The older load instruction that produces the result data may be referred to as the producing (or producer) load instruction. The younger instruction dependent on the result data of the producing load instruction may be referred to as the consuming (or consumer) load instruction. When the target register of an older producing load (read) instruction is also an address register (source operand) of a younger consuming load instruction, the occurrence may be referred to as pointer chasing. Linked list traversals typically include frequent pointer chasing.

For load (read) instructions, the requested data may be retrieved from a cache line within a data cache. Alternatively, the requested data may be retrieved from a store queue, such as in the case when control logic determines whether a load-store dependency exists. Data forwarding of load results to dependent instructions may occur by sending the retrieved data to a reservation station and/or a register file. Afterward, the data may be sent to one or more execution units corresponding to the younger dependent instructions. The data forwarding incurs an appreciable delay. The traversal of one or more linked lists within a software application accumulates this delay and may reduce performance. The latency for receiving and using load instruction result data may vary depending on instruction order within the computer program. The traversal of a linked list is one case that may allow an opportunity to decrease the latency to use load instruction result data.

In view of the above, methods and mechanisms for reducing the latency of dependent load and store instructions are desired.

SUMMARY

Systems, methods, and processors for reducing the latency of memory operations are disclosed.

In one embodiment, a processor may include a load-store unit (LSU) for executing memory operations, and the LSU may comprise at least one or more reservation stations, one or more address generation units (AGUs), a data cache, a load queue, a store queue, and a load-store dependency predictor. In various embodiments, a dependency between an older producer load operation and a younger consumer memory operation may be detected. If the result data for the older producer load operation is predicted to reside in the data cache, the latency of the younger consumer memory operation may be reduced as compared to the case where the result data is predicted to reside in the store queue. In one embodiment, the load-store dependency predictor may be configured to predict if the result data corresponding to a given load operation is stored in the store queue.

If the result data for the older producer load operation is predicted to reside in the data cache, the LSU may be configured to forward the result data from a cache line within the data cache directly to the AGU used to generate an address for the younger consumer memory operation. The younger consumer memory operation may be a load operation or a store operation, depending on the embodiment. In one embodiment, the younger consumer memory operation may be issued from the reservation station in a given clock cycle such that the younger consumer memory operation will arrive at the AGU simultaneously with the result data being forwarded from the data cache.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 4 illustrates one embodiment of a table of computer program instructions.

FIG. 5 illustrates one embodiment of a load-store dependency predictor table.

DETAILED DESCRIPTION OF EMBODIMENTS

Figure 1:
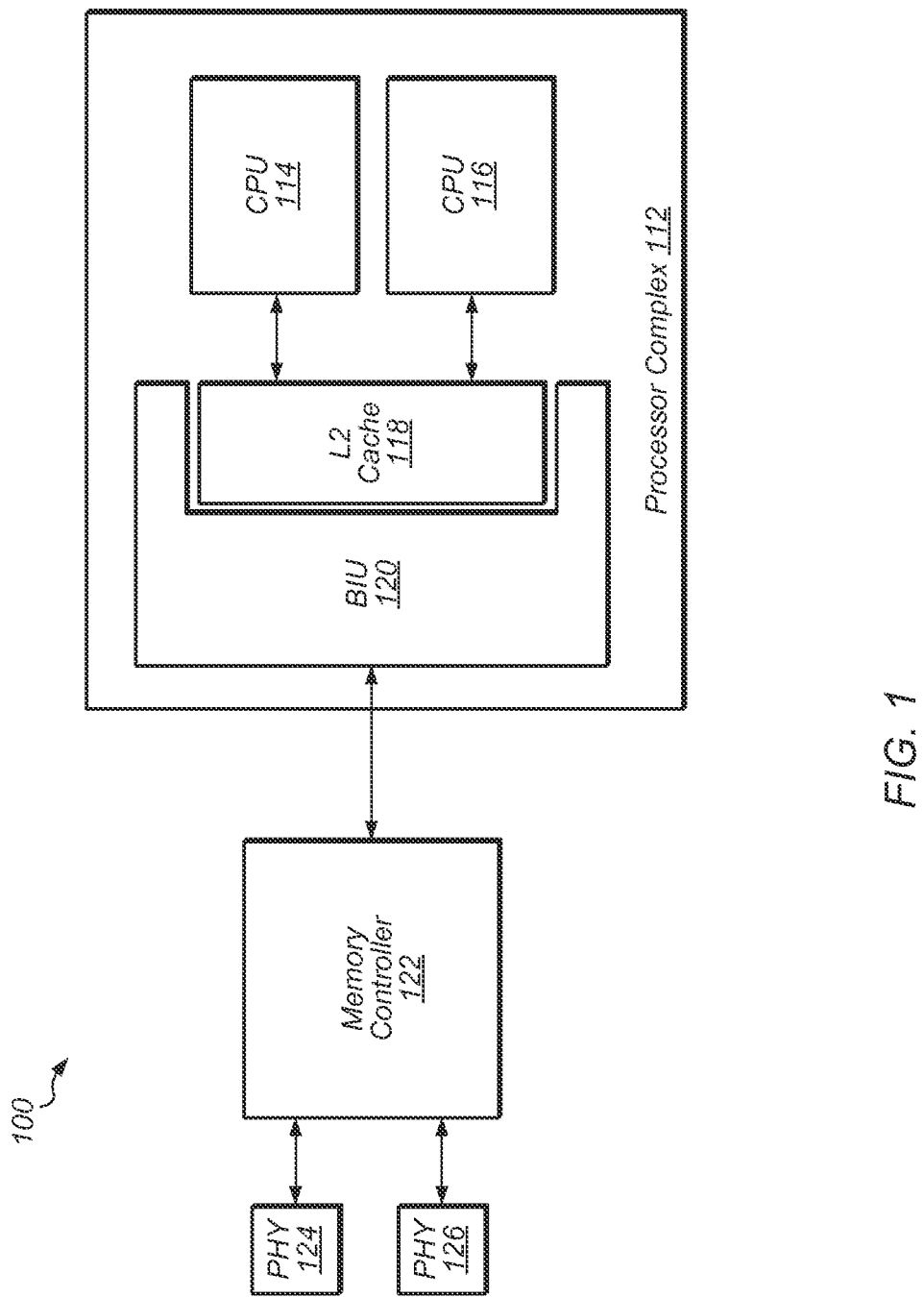
FIG. 1 illustrates one embodiment of a portion of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a load-store unit . . . ." Such a claim does not foreclose the processor from including additional components (e.g., a cache, a fetch unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 100 includes a processor complex 112, memory controller 122, and memory physical interface circuits (PHYs) 124 and 126. It is noted that IC 100 may also include many other components not shown in FIG. 1. In various embodiments, IC 100 may also be referred to as a system on chip (SoC), an application specific integrated circuit (ASIC), or an apparatus.

Processor complex 112 may include central processing units (CPUs) 114 and 116, level two (L2) cache 118, and bus interface unit (BIU) 120. In other embodiments, processor complex 112 may include other numbers of CPUs. CPUs 114 and 116 may also be referred to as processors or cores. CPUs 114 and 116 may be coupled to L2 cache 118. L2 cache 118 may be coupled to BIU 120, which may be coupled to memory controller 122. Other embodiments may include additional levels of cache (e.g., level three (L3) cache). It is noted that processor complex 112 may include other components not shown in FIG. 1.

The CPUs 114 and 116 may include circuitry to execute instructions defined in an instruction set architecture. Specifically, one or more programs comprising the instructions may be executed by the CPUs 114 and 116. Any instruction set architecture (ISA) may be implemented in various embodiments, including industry standard, custom-designed, or proprietary ISA's, or any combination thereof. In various embodiments, CPUs 114 and 116 may execute instructions out-of-order, which in some cases may cause ordering violations.

Each of CPUs 114 and 116 may also include a level one (L1) cache (not shown), and each L1 cache may be coupled to L2 cache 118. In one embodiment, L2 cache 118 may be configured to cache instructions and data for low latency access by CPUs 114 and 116. The L2 cache 118 may comprise any capacity and configuration (e.g. direct mapped, set associative). L2 cache 118 may be coupled to memory controller 122 via BIU 120. BIU 120 may also include various other logic structures to couple CPUs 114 and 116 and L2 cache 118 to various other devices and blocks.

In some embodiments, CPUs 114 and 116 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the data and instruction caches of CPUs 114 and 116 may be partially or completely addressed using physical address bits rather than virtual address bits. For example, the caches may use virtual address bits for cache indexing and physical address bits for cache tags.

Memory controller 122 may include any number of memory ports and may include circuitry configured to interface to memory. For example, memory controller 122 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 122 may also be coupled to memory physical interface circuits (PHYs) 124 and 126. Memory PHYs 124 and 126 are representative of any number of memory PHYs which may be coupled to memory controller 122. The memory PHYs 124 and 126 may be configured to interface to memory devices (not shown).

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
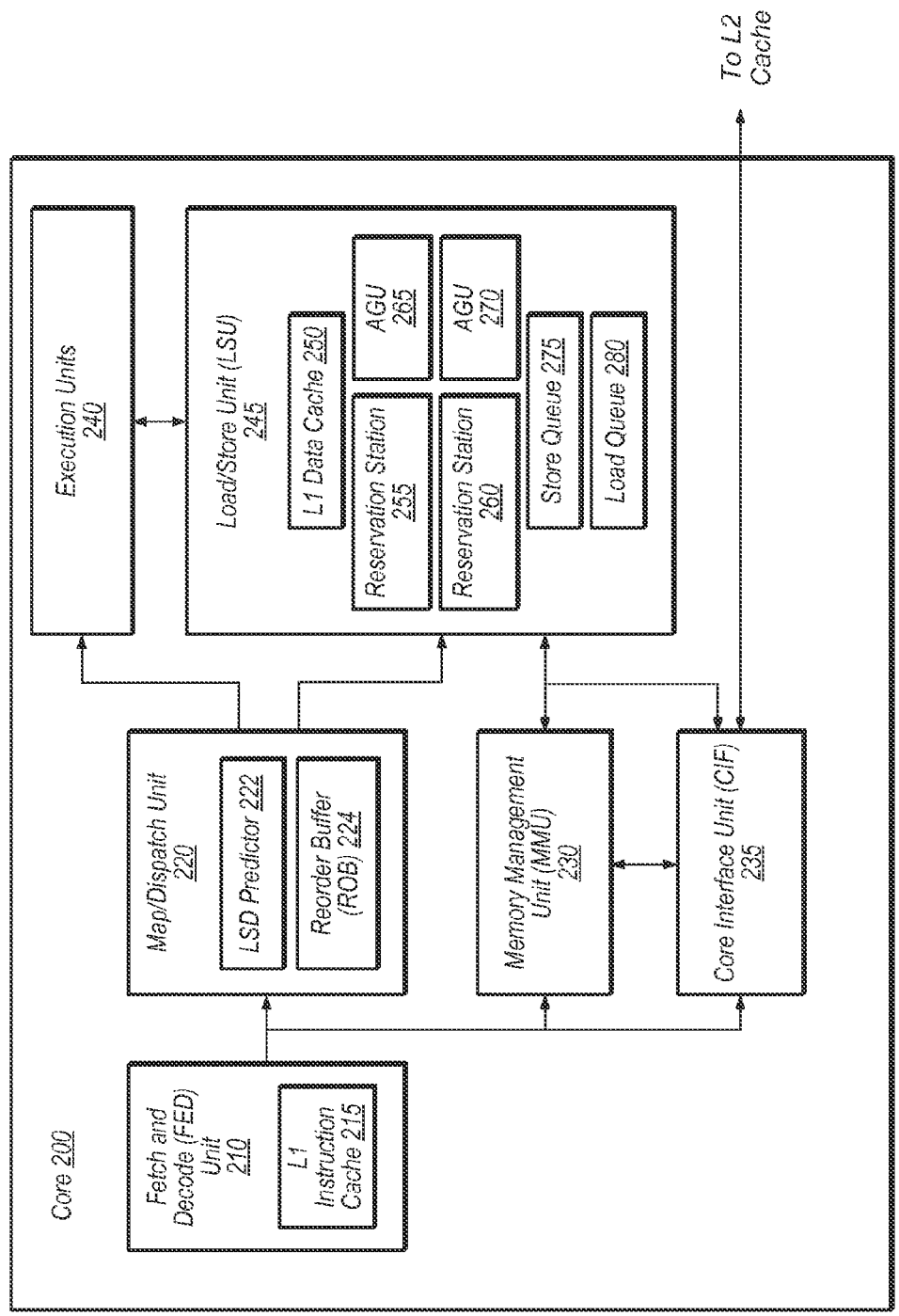
FIG. 2 is a block diagram that illustrates one embodiment of a processor core.

Turning now to FIG. 2, one embodiment of a processor core is shown. Core 200 is one example of a processor core, and core 200 may be utilized within a processor complex, such as processor complex 112 of FIG. 1. In one embodiment, each of CPUs 114 and 116 of FIG. 1 may include the components and functionality of core 200. Core 200 may include fetch and decode (FED) unit 210, map and dispatch unit 220, memory management unit (MMU) 230, core interface unit (CIF) 235, execution units 240, and load-store unit (LSU) 245. It is noted that core 200 may include other components and interfaces not shown in FIG. 2.

FED unit 210 may comprise circuitry configured to generate program counters (PCs) for fetching instructions from level one (L1) instruction cache 215. L1 instruction cache 215 may be a cache memory for storing instructions to be executed by core 200. L1 instruction cache 215 may have any capacity and construction (e.g. direct mapped, set associative, fully associative, etc.). Furthermore, L1 instruction cache 215 may have any cache line size. FED unit 210 may also include branch prediction hardware (not shown) configured to predict branch instructions and to fetch down the predicted path. FED unit 210 may also be redirected (e.g. via misprediction, exception, interrupt, flush, etc.).

FED unit 210 may also be configured to decode the instructions into instruction operations (ops). Generally, an instruction operation may be an operation that the hardware included in execution units 240 and LSU 245 is capable of executing. Each instruction may translate to one or more instruction operations which, when executed, result in the performance of the operations defined for that instruction according to the instruction set architecture. FED unit 210 may be configured to decode multiple instructions in parallel.

In some embodiments, each instruction may decode into a single instruction operation. FED unit 210 may be configured to identify the type of instruction, source operands, etc., and each decoded instruction operation may comprise the instruction along with some of the decode information. In other embodiments in which each instruction translates to a single op, each op may simply be the corresponding instruction or a portion thereof (e.g., the opcode field or fields of the instruction). In some embodiments, the FED unit 210 may include any combination of circuitry and/or microcode for generating ops for instructions. For example, relatively simple op generations (e.g., one or two ops per instruction) may be handled in hardware while more extensive op generations (e.g., more than three ops for an instruction) may be handled in microcode. In other embodiments, the functionality included within FED unit 210 may be split into two or more separate units, such as a fetch unit, a decode unit, and/or other units.

Decoded ops may be provided to map/dispatch unit 220. Map/dispatch unit 220 may be configured to map ops and architectural registers to physical registers of core 200. Map/dispatch unit 220 may implement register renaming to map source register addresses from the ops to the source operand numbers identifying the renamed source registers. Map/dispatch unit 220 may also be configured to dispatch ops to reservation stations within execution units 240 and LSU 245. Map/dispatch unit 220 may include load-store dependency (LSD) predictor 222 and reorder buffer (ROB) 224. Prior to being dispatched, the ops may be written to ROB 224. ROB 224 may be configured to hold ops until they can be committed in order. Each op may be assigned a ROB index (RNUM) corresponding to a specific entry in ROB 224. RNUMs may be used to keep track of the operations in flight in core 200. Map/dispatch unit 220 may also include other components (e.g., mapper array, dispatch unit, dispatch buffer) not shown in FIG. 2. Furthermore, in other embodiments, the functionality included within map/dispatch unit 220 may be split into two or more separate units, such as a map unit, a dispatch unit, and/or other units.

In one embodiment, load-store dependency (LSD) predictor 222 may be configured to train on and predict dependent load-store instruction pairs that are likely to issue out-of-order. In some embodiments, LSD predictor 222 may also be configured to train on producer load operations that are not able to provide result data to their dependent memory operations quickly enough to allow the dependent memory operations to be issued early. Any of a variety of factors may cause a producer load operation to be unable to deliver result data fast enough to allow a dependent memory operation to be issued early from a corresponding reservation state. For example, if the result data of the producer load is not word boundary aligned or requires a sign extension, then the producer load may be unable to deliver result data in the necessary time frame.

In one embodiment, LSD predictor 222 may store program counter (PC) address information of load instructions that have been previously found to be dependent on older store instructions. PC address information of the particular older store instruction may also be stored in a corresponding entry in LSD predictor 222. LSD predictor 222 may additionally store an indication indicating whether a given store instruction with a dependent load instruction has already received result data. Therefore, LSD predictor 222 maintains information for store to load forwarding for both cases where the result data has not yet arrived in the store queue 275 for the store instruction and where the result data has already arrived in the store queue 275 for the store instruction. The LS predictor 222 may also be used to predict whether a given load instruction receives source data from the L1 data cache 250. In one embodiment, when a given producing load operation misses in LSD predictor 222, there may be high confidence that the source operand data for the given load operation is not from the store queue 275, but rather from the L1 data cache 250. AGU 265 or 270 may use the source operand data for generating an address for the consuming memory operation.

If the prediction is wrong, such as if there is a L1 data cache 250 miss for the producing load operation or the producing load operation actually produces a CAM match hit in the store queue 275, then the consuming memory operation may be replayed. One or more operation younger than the producing load operation may also be replayed. Depending on the replay logic, either all younger operations are replayed or only younger operations dependent on the producing load operation are replayed.

LSD predictor 222 may include a table with entries for the producing loads that have been trained, and each entry may include information identifying the load and dependent instructions. In one embodiment, the table may be a 256-entry fully associative structure. In other embodiments, the table may have other numbers of entries. In various embodiments, the table may be a content-addressable memory (CAM) for various fields of the table.

When there is an order violation between dependent load and store operations, core 200 may be redirected and resynced. Various corrective actions may be taken as a result of a redirect. At this point, training may be performed for the particular load-store or load-load pair that caused the resync, causing an entry for this particular pair to be allocated in LSD predictor 222. Then, on a next pass through the pipeline of core 200, when the dependent operation from the pair is dispatched from unit 220, LSD predictor 222 may be searched for the dependent operation.

Execution units 240 may include any number and type of execution units (e.g., integer, floating point, vector). Each of execution units 240 may also include one or more reservation stations (not shown). CIF 235 may be coupled to LSU 245, FED unit 210, MMU 230, and an L2 cache (not shown). CIF 235 may be configured to manage the interface between core 200 and the L2 cache. MMU 230 may be configured to perform address translation and memory management functions.

LSU 245 may include L1 data cache 250, reservation stations 255 and 260, store queue 275, and load queue 280. Load and store operations may be dispatched from map/dispatch unit 220 to reservation stations 255 and 260. Other embodiments may include other numbers of reservation stations. Each reservation station 255 and 260 may include a picker that is configured to issue any operations that are valid. Operations may issue out of reservation stations 255 and 260 out-of-order. Store queue 275 may store data corresponding to store operations, and load queue 280 may store data associated with load operations. LSU 245 may also be coupled to the L2 cache via CIF 235. It is noted that LSU 245 may also include other components (e.g., register file, prefetch unit, translation lookaside buffer) not shown in FIG. 2.

In one embodiment, LSU 245 may have two load-store pipes (not shown). Each load-store pipe may be configured to receive and process either a load or store every clock cycle. In other embodiments, LSU 245 may have other numbers of load-store pipes. Reservation station 255 and address generation unit (AGU) 265 may be located within a first load-store pipe, and reservation station 260 and AGU 270 may be located within a second load-store pipe.

In one embodiment, core 200 may be configured to provide a fast bypass from the data path of LSU 245 to the AGUs 265 and 270. The data path of LSU 245 includes the store queue 275 or data cache 250. In some embodiments, the fast bypass may only be implemented from the data cache 250 to the AGUs 265 and 270 without implementing the fast bypass from store queue 275 to AGUs 265 and 270. In these embodiments, it may not be possible to bypass data from store queue 275 to AGUs 265 and 270 fast enough to meet timing requirements, and so data may only be bypassed from L1 data cache 250.

It should be understood that the distribution of functionality illustrated in FIG. 2 is not the only possible microarchitecture which may be utilized for a processor core. Other processor cores may include other components, omit one or more of the components shown, and/or include a different arrangement of functionality among the components.

Figure 3:
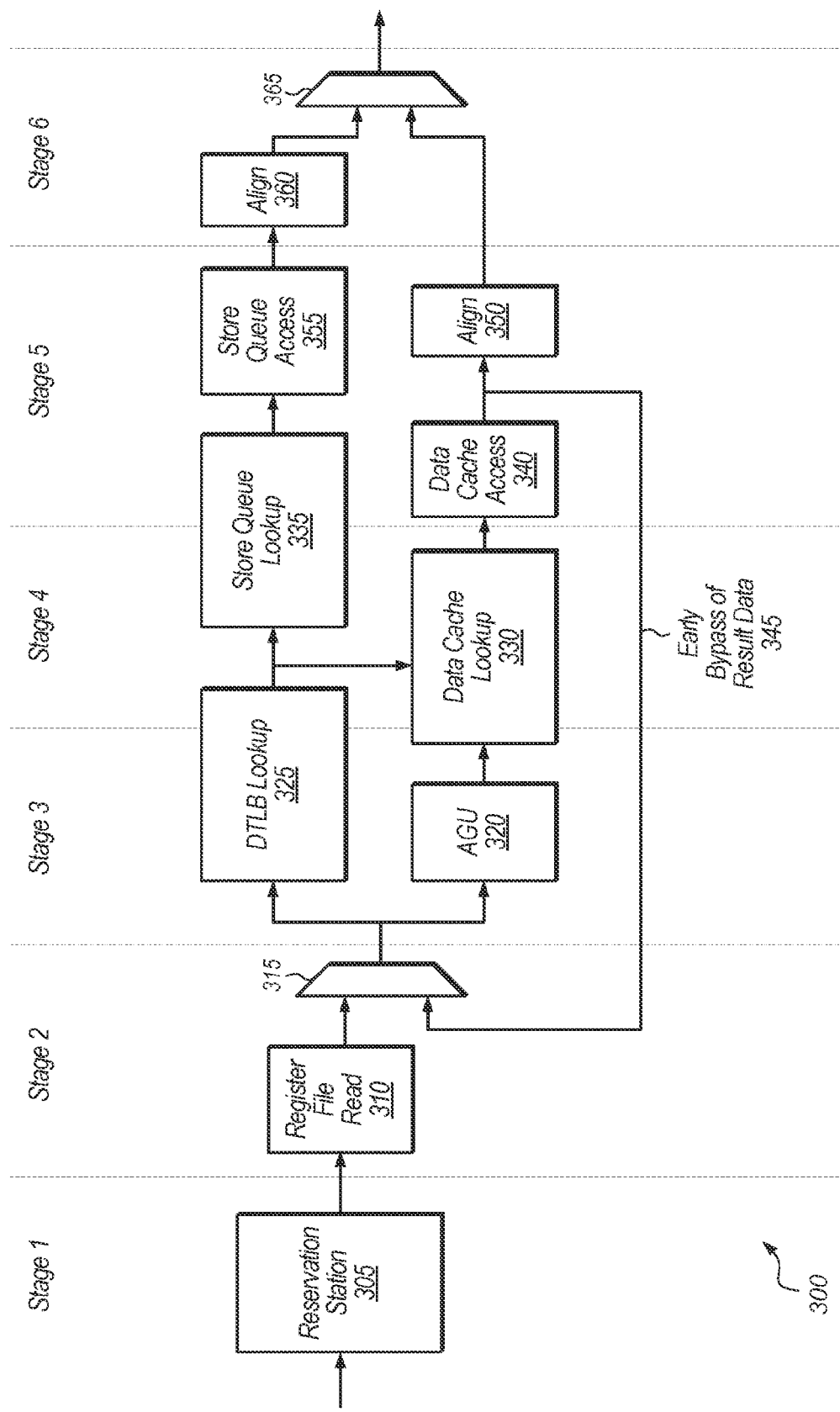
FIG. 3 is a block diagram illustrating one embodiment of a load/store pipe.

Referring now to FIG. 3, a block diagram of one embodiment of a load-store pipe 300 is shown. In one embodiment, a load-store unit (LSU) (e.g., LSU 245 of FIG. 2) may include two separate load-store pipes. In other embodiments, a LSU may include other numbers of load-store pipes. The blocks shown in pipe 300 are in the context of a load operation.

The timing of the different stages of the load-store pipe 300 is shown in FIG. 3. A first stage of the load-store pipe 300 includes the load operation issuing from the reservation station 305. In stage 2, source operands may be read from the register file 310 for the issued load operation. The output of register file 310 may be an input to multiplexer (mux) 315. Another input to mux 315 may be the early bypass of result data 345. Then, in stage 3, the address generation unit (AGU) 320 may compute a virtual address from the source operands and data translation lookaside buffer (DTLB) 325 may be configured to translate the virtual address to a physical address.

The virtual address generated by AGU 320 may be conveyed to data cache lookup 330 in stage 4. Also, the physical address generated by DTLB 325 may be conveyed to data cache lookup 330 and store queue lookup 335 in stage 4. In stage 5, data cache access 340 may be performed and then the early bypass of result data 345 may be forwarded back to mux 315. Early bypass of result data 345 may be connected back to mux 315 prior to the result data going through alignment block 350. Therefore, the result data 345 may not be properly aligned in certain cases depending on the status of the output of data cache access 340. For example, if a sign extension is required or if the result data is not word boundary aligned, then the early bypass of result data 345 may provide erroneous data to AGU 320. In these cases, a pipeline kill to flush the dependent operations may be performed.

In stage 5, store queue access 355 may be performed, and the output of store queue access 355 may pass through alignment block 360 in stage 6. The output of mux 365 may be selected from either the store queue path or the data cache path, and then the output of mux 365 may be forwarded to the bypass muxes (not shown) and back to register file 310.

Turning now to FIG. 4, one embodiment of identification of data dependencies between load and store instructions in computer code is shown. Table 400 illustrates an example of computer program instructions with load and store instructions dependent on other instructions for source operand data. The source operand data is used to generate an address for a memory read access. The generated address may or may not be translated. Translation may comprise a virtualto-physical mapping. Source operand data may contain an immediate integer value included within an instruction. In the example of the load instruction in line 1 of the table 400, the load instruction has an integer value of 8 as an immediate source operand. Another example of source operand data includes data stored in a register by the time execution of the instruction begins. An identifier (ID) within the instruction identifies the register.

Continuing with the example of the load instruction in line 1 of the table 400, the load instruction has a source register R30 that stores data to be used as source operand data by the time execution of the load instruction begins. An address is generated from an addition operation with the integer 8 and the contents stored in register R30. The generated address may be further translated. The data dependencies between load instructions are highlighted in table 400. Table 400 includes 24 lines of code numbered from line 1 to line 24. The lines of code include instructions presented in program order. In the example shown in table 400, the instructions include load, store and arithmetic addition instructions.

For a given load instruction, the result data may be retrieved from a cache line within a data cache. However, the result data for the given load instruction may already be in a processor and may not need to be retrieved from the data cache using a corresponding generated address. For example, the result data may be in an entry in a store queue. The result data may be forwarded from the store queue within the processor to a destination register of the given load instruction. In this case, the result data is not retrieved from the data cache using the corresponding generated address. The forwarding within the processor of the result data may reduce the latency to obtain the result data for the given load instruction.

Similar to the above case of forwarding result data, the source operand data of the given load instruction may also be forwarded. The forwarding of source operand data may reduce the latency of the given load instruction and increase instruction throughput. The source operand data may be forwarded to a source register used by the given load instruction. The forwarding of the source operand data may occur in place of retrieving the source operand data from a register file. For example, the source operand data may be forwarded from an arithmetic logic unit (ALU) in an execution unit, an entry in the store queue, and so forth.

Additionally, the source operand data for the given load instruction may be forwarded directly from a cache pipeline stage. In such a case, the forwarding may occur within a load/store unit (LSU) on the processor after the source operand data is read out from a cache line in a cache array of a data cache. The source operand data for the given load instruction may be retrieved from the data cache due to execution an older (in program order) load instruction. Accordingly, the source operand data may be forwarded to the younger given load instruction within the LSU on the processor. Further details are provided later. In these cases, the given load instruction may be speculatively scheduled to issue early. Other conditions described later may also be checked prior to scheduling the given load instruction early. A predictor may be used to both speculate when data forwarding may be used and to select which source supplies the forwarded data.

In table 400, line 1 includes a load instruction with a source register denoted as R30. As described earlier, an address is generated from the addition operation using the integer 8 and the contents stored in register R30. The generated address may be additionally translated. If data forwarding is not used to obtain the result data, the contents of memory located at this generated address is retrieved from the data cache. Afterward, the retrieved contents of memory, which also may be referred to as the result data, are sent to the destination register. The load instruction in line 1 has a destination register denoted as R13. In some embodiments, each of the registers R13 and R30 are included in a register file.

Lines 2 and 3 in table 400 include an addition instruction and a store instruction, respectively. Each of these instructions is dependent on the load instruction in line 1. Therefore, the instructions in lines 2 and 3 may not be scheduled to issue until the result data is at least retrieved from the data cache and placed in an identified destination register within a register file and/or a reservation station.

The addition instruction in line 2 produces result data that is stored in the destination register R19 in the register file. This result data from the addition instruction is stored in the destination register R19. The result data produced by the addition instruction is also sent to memory for storage by the store instruction in line 3. The load instruction in line 4 utilizes the result data produced by the addition instruction in line 2 as source operand data. Therefore, a corresponding entry in a reservation station for the load instruction in line 4 may receive the result data forwarded from an arithmetic logic unit (ALU). This result data is to be used as source operand data by the load instruction in line 4. The load instruction in line 4 receives source operand data that is in the processor. The latency of the load instruction in line 4 may be reduced due to using forwarded data from the ALU rather than reading data from the register file.

Table 400 illustrates from where the source operand data is sourced for address generation for load instructions. For example, the load instruction in line 7 uses for address generation the data to be stored in the source register denoted as R2. This data is produced by the load instruction in line 4. The producers of source operand data for load instructions are illustrated in table 400, such as in lines 1, 4, 7, 10, 13, 16, 19 and 22-24.

Moving to line 19 in table 400, the producer of the source operand data stored in register R7 for the load instruction at line 19 is an older (in program order) load instruction at line 16. The older load instruction at line 16 utilizes register R7 as a destination register. The result data for the older load instruction at line 16 is retrieved from the data cache at the location indicated by "8(R3)". The address for the load instruction in line 16 is generated from the addition operation between the integer 8 and the data stored in source register R3. In some embodiments, the generated address is translated. The result data stored in a location in the data cache identified by the generated address is retrieved. This result data may be sent to a register file and stored in the register R7 in the register file. Additionally, this result data may be stored in a corresponding entry in a reservation station.

After the above steps, the load instruction at line 19 may be issued and the result data may be sent to an adder to generate an address for the load instruction at line 19. The adder may be located in an ALU within an integer execution unit. Alternatively, the adder may be located within the LSU. The latency for obtaining and using the result data to be stored in the register R7 may incur an appreciable delay. Long transmission lines, repeater buffers, and staging storage elements may be used to transport the result data from the data cache to the register file. Forwarding the result data to the corresponding entry in the reservation station may reduce the latency. However, the on-die real estate layout may still appreciably affect the latency.

Continuing with the above example, the result data produced by the load instruction at line 16 may be sent from read out storage elements in the data cache directly to an adder. The adder may be used to generate an address for the load instruction at line 19 by adding the integer 4 to the data stored in the read out storage elements. If the adder is included within the LSU, then this type of forwarding occurs within the LSU, rather than across the die of the processor. The load-to-load latency may be appreciably reduced. Accordingly, the load instruction at line 19 may be scheduled to issue early. For example, in some processor designs, the load-to-load latency may be 4 clock cycles. However, the load-to-load latency may be 3 or less clock cycles when the result data produced by the older load instruction is from a data cache hit and the result data is forwarded within the LSU to the younger, dependent load instruction.

Similar to the above example regarding the load instruction at line 19, the younger dependent load instructions at lines 22-23 and the younger dependent store instruction at line 24 may be scheduled early. The load and store instructions at lines 19 and 22-24 may be scheduled to issue prior to the result data being stored in a corresponding entry in a reservation station or a scheduler. The load instructions may be scheduled prior to the result data being available within the LSU. For each of these load instructions, the result data produced by an older load instruction may be forwarded within the LSU. This local forwarding may appreciably reduce the load-to-load latency.

Each of the memory instructions at lines 19 and 22-24 satisfy conditions for being scheduled to issue early and reduce the load-to-load latency. For example, each of these load or store instructions is dependent on an older load instruction, rather than an arithmetic operation, a store operation or other operation. Additionally, another condition may be a corresponding older load instruction receives or is scheduled to receive the result data from a data cache hit, rather than from the store queue. Determining the conditions are satisfied for early scheduling of load or store instructions may utilize preexisting logic in the processor. The load instructions at lines 19 and 22-23 may correspond to a traversal of one or more linked lists within a software application. Reducing the load-to-load and load-to-store latency may improve processor performance for processing the instructions of the application.

The load instructions at lines 1, 4, 7, 10, 13 and 16 do not satisfy the conditions described above. Accordingly, these load instructions are not scheduled to issue early as described above. The load instructions at lines 1, 4 and 10 are not dependent on an older load instruction. The source operand data for the load instructions at lines 7, 13 and 16 are dependent on older load instructions that receive or are scheduled to receive result data from a source other than a data cache hit. For example, the source may be the store queue.

Turning now to FIG. 5, one embodiment of a load-store dependency predictor table is shown. Table 500 may include various numbers of entries, depending on the embodiment. Each entry may correspond to a load-store pair that has been predicted to have overlapping addresses and issue out of order or to a producer load that is not able to source data to a dependent operation within an early time window. Entries may be allocated in table 500 in response to an ordering violation being detected for a given load-store pair or in response to detecting a producer load that forwards result data from the store queue. In the event that an ordering violation has occurred, the processor may be flushed and table 500 may be trained on this violation.

Table 500 may be configured to allow multiple simultaneous accesses and updates by multiple ops. Furthermore, while table 500 is illustrated as an integrated table, the different fields may be separate tables corresponding to separate memories, with entries of the separate tables associated with each other. For example, the producer operation PCs may be a separate table, the dependent operation PCs may be a separate table, and a producer operation PC entry may correspond to a dependent operation PC entry for which a specific load-store ordering violation or load-load/store timing violation has been detected and trained.

Each entry may include a valid indicator 510. Valid indicator 510 may indicate if the entry is a valid entry and if the entry should be used for enforcing a dependency between the load and store indicated by the entry. In one embodiment, the valid indicator 510 may be cleared at reset. Valid indicator 510 may also affect the replacement policy, such that invalid entries may be the first entries that are replaced when new entries are allocated.

Each entry may also include a producer operation PC value 520 to identify the specific producer load or store operation. In some embodiments, the producer operation PC value may be combined with architectural registers and/or hashed. When a producer operation is dispatched, the producer operation PCs of table 500 may be searched for the PC of the dispatched producer operation. Table 500 may be a CAM for the producer operation PC field, where each entry in the memory includes circuitry to make the comparison. The producer operation PC field may also be a set of registers and comparators that are operated as a CAM. If a producer store matches on any entries, then these entries may have the armed bit 540 set. The RNUM of the store may also be written to the producer operation RNUM 530 field of the entry. When a store is issued from a reservation station, then the armed bit 540 may be cleared from any entries of table 500 that were previously armed by that particular store.

When a dependent operation is dispatched, the dependent PC value 550 of each entry of table 500 may be searched for the PC of the dispatched dependent operation. Table 500 may be a CAM for the dependent PC field. If a dispatched load matches on any entries armed by a producing store operation, then a dependency may be established and enforced for the specific load. If the load matches on an unarmed entry, then a load-store dependency is not established because an ordering violation should not occur. If the load matches on multiple armed entries, then the load may wait until all older stores have been issued before the load itself issues. If the load matches on a single armed entry, then the store RNUM may be written to the reservation station with the load. There may also be a dependency bit set for the load in the reservation station to indicate that the load has a valid dependency.

Each entry may also include one or more status fields 560. The status field(s) 560 may indicate the type of entry for the type of dependency being stored. For example, the status field(s) 560 may indicate whether the entry corresponds to a load-store pair with an ordering violation, a producer load that sources data from the store queue without an ordering violation, or a producer load that is unable to provide data from the data cache for a dependent memory operation in the early time window required for an early issuance. In other embodiments, table 500 may include additional fields and/or omit one or more fields shown in FIG. 5. Furthermore, table 500 may be formatted differently in other embodiments.

Figure 6:
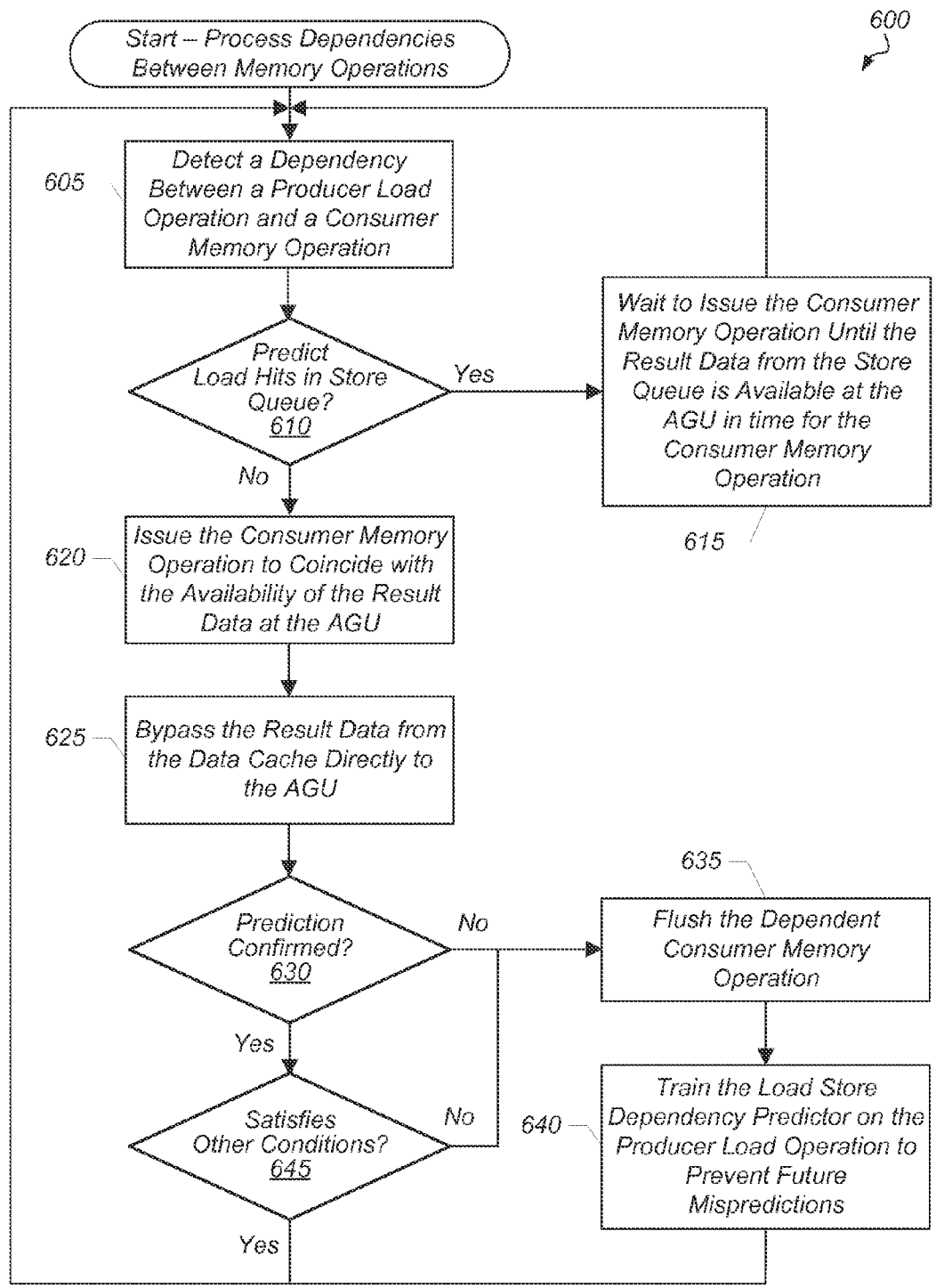
FIG. 6 is a generalized flow diagram illustrating one embodiment of a method for processing dependent memory operations.

Turning now to FIG. 6, one embodiment of a method 600 for processing dependencies between memory operations is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Additionally, the sections of the flowchart may be performed in parallel for processing multiple load operations simultaneously. Any of the processors and/or load-store units described herein may be configured to perform method 600.

A processor may detect a dependency between a producer load operation and a consumer memory operation (block 605). In one embodiment, a decode unit and a mapper in the processor may detect this dependency. The producer load operation may produce result data which is utilized by a subsequent, younger memory operation. The consumer memory operation may be a load or store memory operation. Next, the processor may predict whether the producer load operation will hit in the store queue (conditional block 610). In one embodiment, the processor may predict whether the producer load operation will hit in the store queue by performing a lookup of the producer load operation in a load-store dependency predictor. If the load-store dependency predictor has an entry for the producer load operation, then the processor may predict that the producer load operation will hit in the store queue. Otherwise, if the load-store dependency predictor does not have an entry for the producer load operation, then the processor may predict that the producer load operation will not hit in the store queue. In other embodiments, the processor may utilize other techniques for determining if the producer load operation will hit in the store queue.

If the processor predicts that the producer load operation will hit in the store queue (conditional block 610, "yes" leg), then the processor may wait to issue the consumer memory operation until the result data from the store queue is available at the address generation unit (AGU) in time for the consumer memory operation (block 615). In one embodiment, the result data from the store queue may be available at the AGU to coincide with the consumer memory operation if the consumer memory operation is issued four clock cycles after the producer load operation. Accordingly, in this embodiment, the processor may wait for at least four clock cycles after issuing the producer load operation until issuing the consumer memory operation. After block 615, method 600 may return to block 605 to wait until another dependency is detected in the processor pipeline.

If the processor predicts that the producer load operation will not hit in the store queue (conditional block 610, "no" leg), then the processor may issue the consumer memory operation to coincide with the timing of when the result data from the data cache will be available at the AGU (block 620). In other words, the processor may issue the consumer memory operation so that the consumer memory operation will arrive at the AGU in the same clock cycle as the producer load operation's result data arrives at the AGU after being forwarded directly from the data cache. In one embodiment, the result data from the data cache may be available at the AGU simultaneously with the consumer memory operation if the consumer memory operation is issued three clock cycles after the producer load operation. Accordingly, in this embodiment, the processor may issue the consumer memory operation three clock cycles after issuing the producer load operation. In this embodiment, the early issue of the consumer memory operation may save one clock cycle as compared to a four clock cycle latency for consumer memory operations corresponding to producer load operations that hit in the store queue. In various embodiments, a consumer memory operation may issue M clock cycles after a producer load operation if the producer load operation hits in the data cache or the consumer memory operation may issue N clock cycles after the producer load operation if the producer load operation hits in the store queue, wherein 'N' is a positive integer and M<N. For example, in one embodiment M=N−1.

Next, the LSU may bypass result data of the producer load from the data cache directly to the address generation unit for the consumer memory operation (block 625). Also, the processor may perform a check to confirm the prediction that the producer load operation did not hit in the store queue (conditional block 630). If the prediction was wrong and the producer load operation hits in the store queue (conditional block 630, "no" leg), then a pipeline kill to flush the dependent consumer memory operation may be performed (block 635). Additionally, the load store dependency predictor may be trained on the producer load operation to prevent future mispredictions (block 640). After block 640, method 600 may return to block 605 to wait until another dependency is detected in the processor pipeline.

If the check confirms the prediction (i.e., the producer load operation misses in the store queue) (conditional block 630, "yes" leg), then the processor may check to determine if the producer load operation satisfies one or more other conditions for implementing the early issuance of the dependent consumer memory operation (conditional block 645). In one embodiment, the one or more other conditions may include having a word-boundary aligned address, not needing a sign extension, and not being in Big Endian mode. If the producer load is in Big Endian mode, the most significant byte of the producer load would be stored in the smallest address and the least significant byte of the producer load would be stored in the largest address. In contrast, if the producer load is in Little Endian mode, then the most significant byte of the producer load would be stored in the largest address and the least significant byte of the producer load would be stored in the smallest address. If the producer load operation satisfies these one or more conditions (conditional block 645, "yes" leg), then method 600 may return to block 605 to wait until another dependency is detected in the processor pipeline. If the producer load operation does not satisfy these one or more conditions (conditional block 645, "no" leg), then a pipeline kill to flush the dependent consumer memory operation may be performed (block 635) and the load store dependency predictor may be trained on the producer load operation to prevent future pipeline flushes (block 640).

Figure 7:
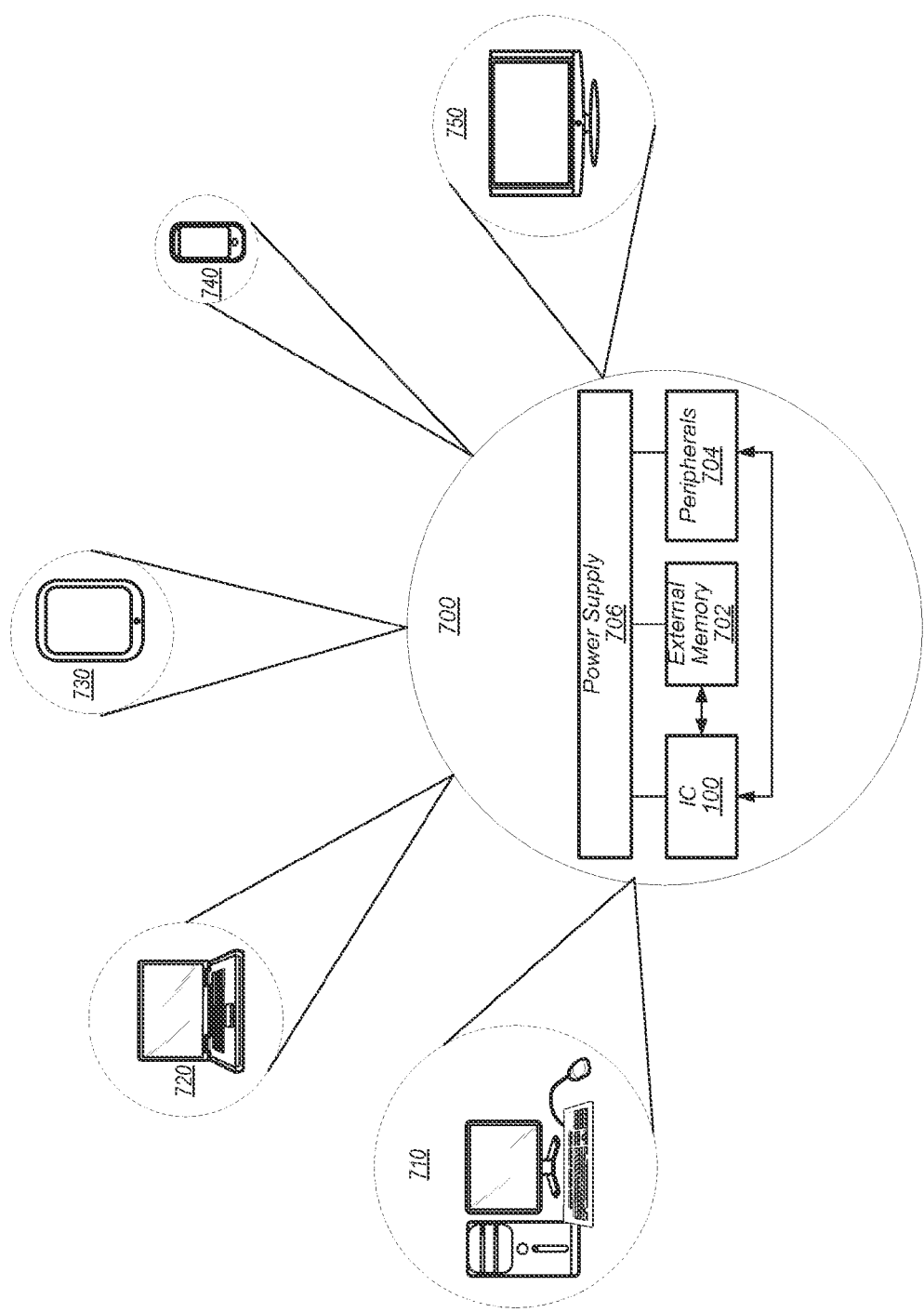
FIG. 7 is a block diagram of one embodiment of a system.

Referring next to FIG. 7, a block diagram of one embodiment of a system 700 is shown. As shown, system 700 may represent chip, circuitry, components, etc., of a desktop computer 710, laptop computer 720, tablet computer 730, cell phone 740, television 750 (or set top box configured to be coupled to a television), or otherwise. Other devices are possible and are contemplated. In the illustrated embodiment, the system 700 includes at least one instance of IC 100 (of FIG. 1) coupled to an external memory 702.

IC 100 is coupled to one or more peripherals 704 and the external memory 702. A power supply 706 is also provided which supplies the supply voltages to IC 100 as well as one or more supply voltages to the memory 702 and/or the peripherals 704. In various embodiments, power supply 706 may represent a battery (e.g., a rechargeable battery in a smart phone, laptop or tablet computer). In some embodiments, more than one instance of IC 100 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 100 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as wifi, Bluetooth, cellular, global positioning system, etc. The peripherals 704 may also include additional storage, including RAM storage, solid state storage, or disk storage. The peripherals 704 may include user interface devices such as a display screen, including touch display screens or multi-touch display screens, keyboard or other input devices, microphones, speakers, etc.

Figure 8:
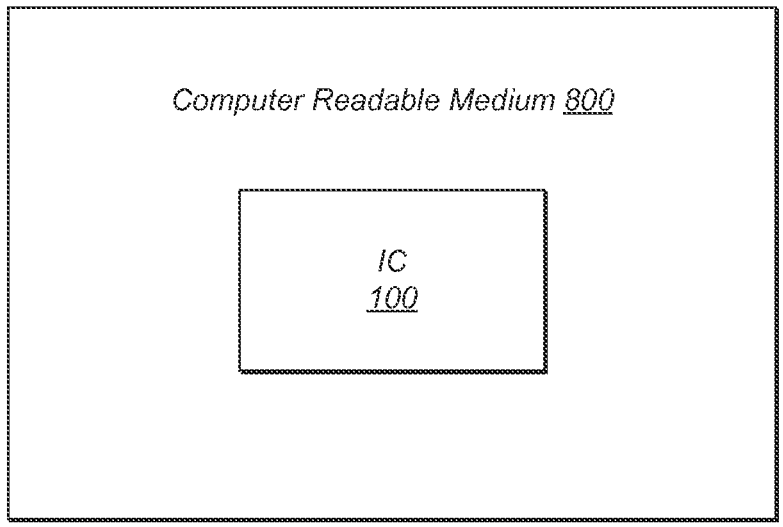
FIG. 8 is a block diagram of one embodiment of a computer readable medium.

Turning now to FIG. 8, one embodiment of a block diagram of a computer readable medium 800 including one or more data structures representative of the circuitry included in IC 100 (of FIG. 1) is shown. Generally speaking, computer readable medium 800 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 800 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 230 may be the netlist(s) (with or without the synthesis library) or the data set(s), as desired. In yet another alternative, the data structures may comprise the output of a schematic program, or netlist(s) or data set(s) derived therefrom.

While computer readable medium 800 includes a representation of IC 100, other embodiments may include a representation of any portion or combination of portions of IC 100 (e.g., LSU 245).

Figure 9:
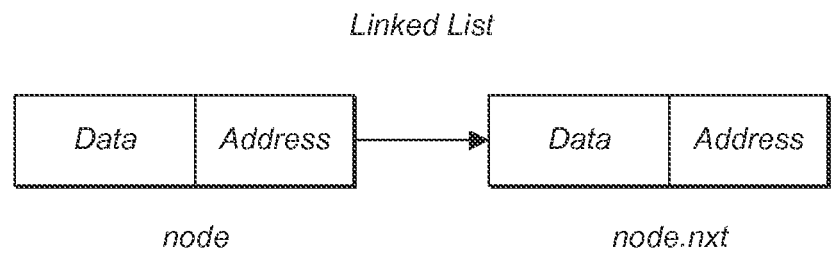
FIG. 9 is a block diagram of one embodiment of a linked list.

Referring now to FIG. 9, one example of a linked list is shown. A linked list is a data structure consisting of a group of nodes which together represent a sequence. Typically, each node is composed of a datum and a reference (i.e., a link) to the next node in the sequence. This structure allows for the efficient insertion or removal of elements from any position in the sequence.

In the example shown, the first node shown in FIG. 9 has a data field and an address field which points to node.nxt. It is noted that node.nxt may also point to another node (although not shown), which may point to a further node, and so on. While linked lists provide certain advantages over other data structures, traversing such lists may incur relatively significant latencies. This increase in latency can result in performance reduction of the host processor. The techniques disclosed herein provide ways to reduce latency and increase processor efficiency when traversing linked lists.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a load-store unit (LSU);
   a store queue; and
   a load-store dependency predictor configured to generate a prediction as to whether a load operation is going to hit in the store queue;
   wherein the processor is configured to:
      determine that a younger memory operation is dependent on an older load operation;
      generate, by the load-store dependency predictor, a prediction as to whether the older load operation will hit in the store queue;
      in response to the prediction indicating that the older load operation is predicted to hit in the store queue, issue the younger memory operation N clock cycles subsequent to the older load operation, wherein N is a positive integer; and
      in response to the prediction indicating that the older load operation is predicted to miss in the store queue, issue the younger memory operation M clock cycles subsequent to the older load operation, wherein M is a positive integer less than N.

2. The processor as recited in claim 1, wherein the LSU is configured to forward result data from a data cache to an address generation unit for the younger memory operation responsive to determining that the prediction indicates the older load operation is predicted to miss in the store queue.

3. The processor as recited in claim 1, wherein the load-store dependency predictor comprises a table with entries configured to store information for loads that have been trained.

4. The processor as recited in claim 1, wherein the load-store dependency predictor is further configured to:
   predict if the older load operation has a word-boundary aligned address; and
   predict if result data of the older load operation requires a sign extension.

5. The processor as recited in claim 2, wherein the processor is further configured to utilize the result data to compute an address for the younger memory operation.

6. The processor as recited in claim 1, wherein the younger memory operation is a store operation.

7. The processor as recited in claim 1, wherein the processor is further configured to issue the younger memory operation M clock cycles subsequent to the older load operation in further response to determining:
  result data corresponding to the older load operation is word boundary aligned; and
  the result data does not require a sign extension.

8. A method comprising:
  determining that a younger memory operation is dependent on an older load operation;
  generating, a load-store dependency predictor, a prediction as to whether the older load operation will hit in a store queue of a load-store unit;
  in response to the prediction indicating that the older load operation is predicted to hit in the store queue, issuing the younger memory operation N clock cycles subsequent to the older load operation, wherein N is a positive integer; and
  in response to the prediction indicating that the older load operation is predicted to miss in the store queue, issuing the younger memory operation M clock cycles subsequent to the older load operation, wherein M is a positive integer less than N.

9. The method as recited in claim 8, wherein M is equal to N−1.

10. The method as recited in claim 8, further comprising forwarding result data from a data cache for the younger memory operation responsive to determining that the prediction indicates the older load operation is predicted to miss in the store queue.

11. The method as recited in claim 9, further comprising issuing the younger memory operation M clock cycles after the older load operation in further response to determining that result data of the older load operation is word boundary aligned.

12. The method as recited in claim 9, further comprising issuing the younger memory operation M clock cycles after the older load operation in further response to determining that result data of the older load operation does not require a sign extension.

13. The method as recited in claim 8, wherein said determining is performed prior to issuing the younger memory operation.

14. A system comprising:
  a processor; and
  a memory;
  a load-store dependency predictor configured to generate a prediction as to whether a load operation is going to hit in the store queue;
  wherein the processor is configured to:
    determine that a younger memory operation is dependent on an older load operation;
    generate, by the load-store dependency predictor, a prediction as to whether the older load operation will hit in the store queue;
    in response to the prediction indicating that the older load operation is predicted to hit in the store queue, issue the younger memory operation N clock cycles subsequent to the older load operation, wherein N is a positive integer; and
    in response to the prediction indicating that the older load operation is predicted to miss in the store queue, issue the younger memory operation M clock cycles subsequent to the older load operation, wherein M is a positive integer less than N.

15. The system as recited in claim 14, wherein the processor is further configured to forward result data from a data cache directly to an address generation unit for the younger memory operation.

16. The system as recited in claim 14, wherein the processor is configured to train the load-store dependency predictor responsive to a mispredict of a given older load operation.

17. The system as recited in claim 14, wherein the processor is configured to flush a corresponding younger memory operation responsive to detecting a mispredict of the older load operation.

18. The system as recited in claim 15, wherein the address generation unit is configured to utilize the result data to compute an address for the younger memory operation.

* * * * *